(12) United States Patent
Alexander et al.

(10) Patent No.: US 8,935,578 B2
(45) Date of Patent: Jan. 13, 2015

(54) METHOD AND APPARATUS FOR OPTIMIZING POWER AND LATENCY ON A LINK

(71) Applicant: Intel Corporation, Santa Clara, CA (US)

(72) Inventors: James W. Alexander, Hillsboro, OR (US); Buck W. Gremel, Olympia, WA (US); Pinkesh J. Shah, Gilbert, AZ (US); Malay Trivedi, Chandler, AZ (US); Mohan K. Nair, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 175 days.

(21) Appl. No.: 13/631,934

(22) Filed: Sep. 29, 2012

(65) Prior Publication Data

US 2014/0095944 A1    Apr. 3, 2014

(51) Int. Cl.
*G06F 11/00* (2006.01)

(52) U.S. Cl.
USPC ............. 714/47.1; 714/40; 714/43; 714/47.2; 714/56

(58) Field of Classification Search
USPC ............................ 714/40, 43, 47.1, 47.2, 56
See application file for complete search history.

(56) References Cited

U.S. PATENT DOCUMENTS

| | | | |
|---|---|---|---|
| 7,134,007 B2 | 11/2006 | Zimmer et al. | |
| 7,783,788 B1 | 8/2010 | Quinn et al. | |
| 8,214,523 B2 * | 7/2012 | Drew et al. | 709/238 |
| 8,745,265 B2 * | 6/2014 | Drew et al. | 709/238 |
| 2006/0080463 A1 * | 4/2006 | Drew et al. | 709/238 |
| 2008/0082683 A1 | 4/2008 | DelloStritto et al. | |
| 2011/0208984 A1 | 8/2011 | Naware et al. | |
| 2012/0198093 A1 * | 8/2012 | Drew et al. | 709/241 |

OTHER PUBLICATIONS

International Search Report and Written Opinion received for PCT Patent Application No. PCT/US2013/045901, mailed on Jul. 22, 2013, 9 pages.

* cited by examiner

*Primary Examiner* — Joshua P Lottich
(74) *Attorney, Agent, or Firm* — Carrie A. Boone, P.C.

(57) ABSTRACT

An apparatus and method are disclosed to optimize the latency and the power of a link operating inside a processor-based system. The apparatus and method include a latency meter built into a queue that does not rely on a queue-depth threshold. The apparatus and method also include feedback logic that optimizes power reduction around an increasing latency target to react to sluggish re-provisioning behavior imposed by the physical properties of the link.

30 Claims, 9 Drawing Sheets

METHOD AND APPARATUS FOR OPTIMIZING POWER AND LATENCY ON A LINK

TECHNICAL FIELD

This application relates to processor-based systems and the efficient processing machine-level code within a link of the processor-based system.

BACKGROUND

When a processor-based system is turned on, instructions within the system is run to power up the various parts of the system, such as the video display, the keyboard, and the hard drive. Eventually, an operating system is loaded, which generally includes an attractive graphical user interface. The loaded operating system enables the user to do a myriad of different actions with the system, typically, by loading a piece of software onto the system.

Besides these operations, there are many other actions taking place outside of the view of the system user. Portable machine code (pcode) within the system, for example, enables different entities within the system to communicate with one another. The entities include, but are not limited to, central processing units (CPUs), memories, graphics controllers, busses, and peripheral hubs that connect to and control the various peripheral devices connected to the processor-based system.

As with the higher-level operating system, driver, and other software loaded into the system, the portable machine code running inside the system may experience latency, which diminishes the efficiency of the system. Latency is a measure of time delay and can impact virtually any communication between any devices.

Many systems today are built under the PCI Express standard (PCIe), in which the link power, the number of lanes between devices, is adjustable. One, two, four, eight, sixteen, and thirty-two lanes are possible under PCIe. Thus, a "by eight" (×8) system means there are eight lanes being used, with each lane having two differential signaling pairs, one for transmission and the other for reception. The number of lanes in use at a given moment affects the throughput of the system, and thus the speed at which operations take place.

Also under PCIe, many processor-based systems today are designed with low power states. Particularly for laptops, cellphones, and other power-sensitive devices, the low power states occur when the system is not being used, thus hopefully prolonging the battery life, and thus the portability, of the device. Although low power states may be achieved by turning off parts of the system, reducing the link power is also a mechanism for reducing the power consumed by the system.

Reducing link power to save energy may increase the latency of the system. There are solutions to mitigate the latency issue. The solutions rely on 1) "nimble" hardware, 2) deep buffers, 3) unsaturated queues, or 4) a combination of 1), 2), and 3).

If the hardware in the system is nimble enough, for example, the hardware may re-provision the link rapidly. For example, there are specialized busses that connect between CPUs, known as quick path interconnect (QPI) busses. The QPI bus is designed to speed up communication between two CPUs and has a link width designator, L0p. QPI's L0p "blackout" time during upshift from one link width to another link width is only a few tens of nanoseconds, which allows for short response delays on the order of tens of microseconds to service spurts of heavy traffic between the CPUs.

Deep buffers are provided by endpoints. For example, a network interface card (NIC) may provide 64 kilobytes of buffer storage in its LAN-to-PCIe pipeline. This provides the NIC with large amounts of data to feed through the pipeline during processing flows. Large buffers hide latency by storing incoming requests while the consumer is returning to full operation, such as when exiting a power-control state. The consumer in this context is the buffer content-consuming PCIe link, which is momentarily (e.g., a few microseconds) offline.

Transmit queues may help with the latency issue, but are expected to behave in a particular manner. For example, the QPI bus has a small packet payload, combined with the relatively random behavior of cache-misses, which leaves its relatively small (a few tens of lines) queue in an "un-saturated" state most of the time. At full load, the queue is rarely empty, and is rarely full. Hence, for the QPI bus, a queue-depth threshold works well as a proxy for latency.

Now consider the typical PCie behavior of a front-end server whose main task is to deliver webpages. The hardware isn't "nimble": a PCie re-provisioning cycle incurs a link blackout on the order of several microseconds, which pushes the "checkpoint" interval for re-provisioning decisions into the millisecond range. The root complex buffer is only four kilobytes deep: The webpage to be transmitted is many times larger. Therefore, when the webpage starts "pouring" through the PCIe transmitter pipeline, it saturates the queue, and when it stops, the queue goes empty. There is little opportunity for the queue to "bounce around" in some mid-state. Hence, using a queue-depth threshold in the root-complex serves as a poor proxy for latency.

Thus, there is a continuing need for a solution that overcomes the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a system and method are disclosed to optimize the latency and the power of a link operating inside a processor-based system. The system and method include a latency meter built into a queue that does not rely on a queue-depth threshold. The system and method also include feedback log that optimizes power reduction around an increasing latency target to react to the sluggish re-provisioning behavior imposed by the physical properties of the link.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

The following describes a system and method for optimizing the latency and power of a link operating inside a processor-based system. As used herein, the link is any connection between two units of the processor-based system. For example, the link may be a connection over the QPI bus between two CPUs of the processor-based system. Or the link may be a connection between one of the CPUs and a peripheral controller hub (PCH) or other supporting circuit. The operations described herein may apply to any of a number of different links within a processor-based system.

Serial Point-to-Point Layered Protocol Link/Interconnect

Figure 1:
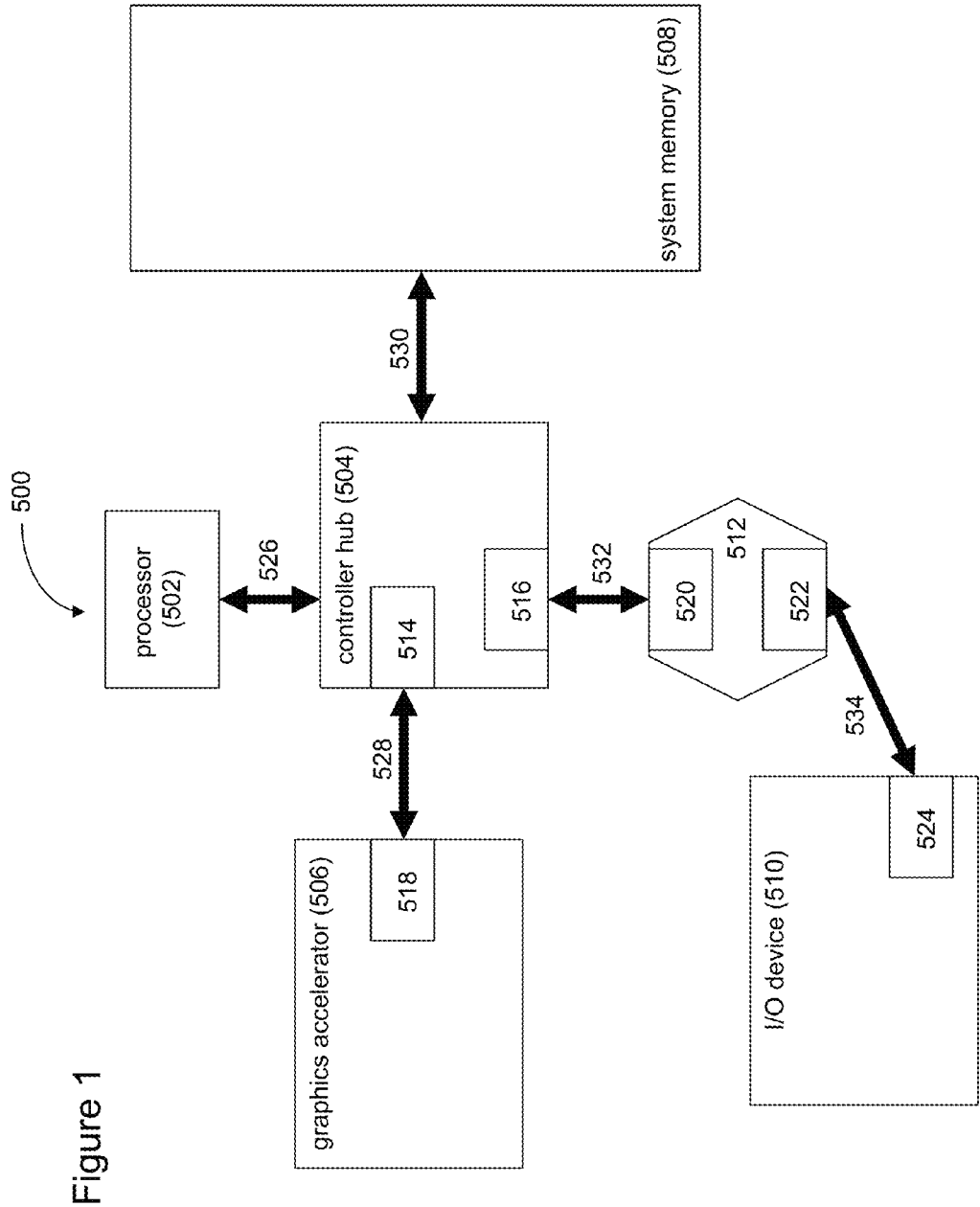
FIG. 1 is a simplified block diagram of a system including a serial point-to-point interconnect to connect I/O devices in a computer system, according to some embodiments.

FIG. 1 is a simplified block diagram of a system including devices coupled to a controller hub via a serial link, according to some embodiments. The system 500 includes a processor 502 and system memory 508 coupled to controller hub 504. Processor 502 includes any processing element, such as a microprocessor, a host processor, an embedded processor, a co-processor, or other processor. Processor 502 is coupled to controller hub 504 through a front-side bus (FSB) 526. In some embodiments, the FSB 526 is a serial point-to-point interconnect, as described below.

System memory 508 includes any memory device, such as random access memory (RAM), non-volatile (NV) memory, or other memory accessible by devices in the system 500. System memory 508 is coupled to controller hub 504 through memory interface 530. Examples of a memory interface include a double-data rate (DDR) memory interface, a dual-channel DDR memory interface, and a dynamic RAM (DRAM) memory interface.

In some embodiments, the controller hub 504 is a root hub or root controller in a Peripheral Component Interconnect Express (PCIe) interconnection hierarchy. Examples of the controller hub 504 include a chipset, a memory controller hub (MCH), a northbridge, an interconnect controller hub (ICH) a southbridge, and a root controller/hub. Often, the term "chipset" refers to two physically separate controller hubs, i.e. a memory controller hub (MCH) coupled to an interconnect controller hub (ICH).

Here, controller hub 504 is coupled to switch/bridge 512 through serial link 532. Input/output modules 516 and 520, which may also be referred to as interfaces/ports 516 and 520, include/implement a layered protocol stack to provide communication between controller hub 504 and switch 512. A module, such as modules 516, 514, 520, 522, 524, and 518, may be implemented in hardware, software, firmware, or any combination thereof. Furthermore, module boundaries commonly vary and functions are implemented together, as well as separately, in different embodiments. In some embodiments, multiple devices are capable of being coupled to switch 512.

Switch 512 routes packets/messages from device 510 upstream, i.e. up a hierarchy toward a root controller, to controller hub 504 and downstream, i.e. down a hierarchy away from a root controller, from processor 502 or system memory 508, to device 510. Device 510 includes any internal or external device or component to be coupled to an electronic system, such as an I/O device, a network interface controller (NIC), an add-in card, an audio processor, a network processor, a hard-drive, a storage device, a CD/DVD ROM, a monitor, a printer, a mouse, a keyboard, a router, a portable storage device, a firewire device, a universal serial bus (USB) device, a scanner, and other input/output devices.

Graphics accelerator 506 is also coupled to the controller hub 504 through a serial link 528. In some embodiments, the graphics accelerator 506 is coupled to an MCH, which is coupled to an ICH. The switch 512, and accordingly, the I/O device 510, is then coupled to the ICH. I/O modules 518 and 514 are also to implement a layered protocol stack to communicate between the graphics accelerator 506 and the controller hub 504.

Figure 2:
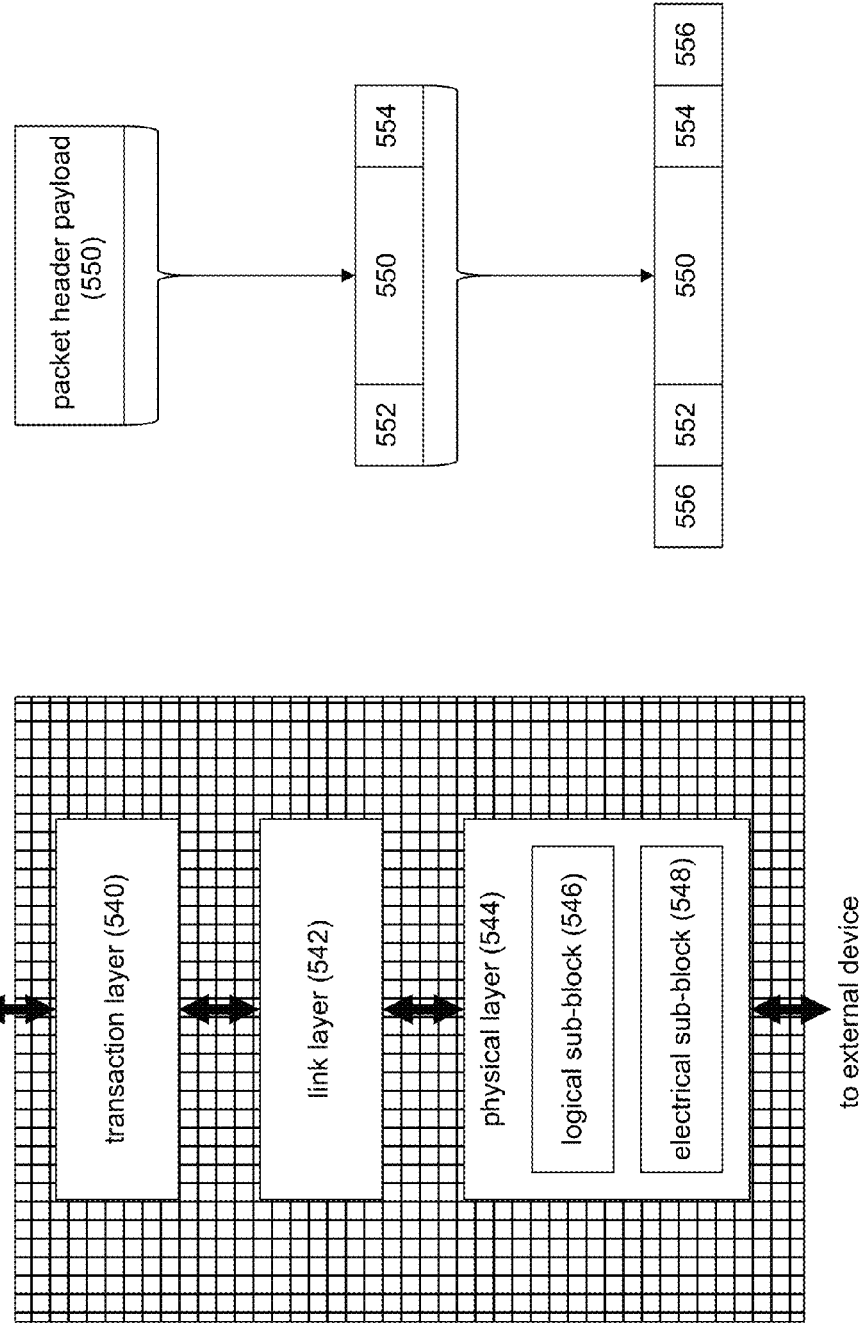
FIG. 2 is a simplified block diagram of a layered protocol stack, according to some embodiments.

FIG. 2 is a simplified diagram of a layered protocol stack, according to some embodiments. The layered protocol stack 600 includes any layered communication stack, such as a common standard interface (CSI) stack, PCIe stack, or other protocol stack. In some embodiments, the protocol stack 600 is a PCIe protocol stack, including a transaction layer 540, a link layer 542, and a physical layer 544. An interface, such as interfaces 516, 514, 520, 522, 524, and 518 in FIG. 1, may be represented as a communication protocol stack 500. Representation as a communication protocol stack is also referred to as a module or interface implementing/including a protocol stack.

Transaction Layer

In some embodiments, transaction layer 540 provides an interface between a device's processing core and the interconnect architecture, such as the data link layer 542 and the physical layer 544. In this regard, a primary responsibility of the transaction layer 540 is the assembly and disassembly of packets (i.e., transaction layer packets, or TLPs). PCIe implements split transactions, i.e. transactions with request and response separated by time, allowing a link to carry other traffic while the target device gathers data for the response.

In addition, PCIe utilizes credit-based flow control. In this scheme, a device advertises an initial amount of credit for each of the receive buffers in the transaction layer 540. An external device at the opposite end of the link, such as the controller hub 504 in FIG. 1, counts the number of credits consumed by each TLP. A transaction may be transmitted if the transaction does not exceed the credit limit. Upon receiving a response, an amount of credit is restored. One advantage of the credit scheme is that the latency of credit return does not affect performance, provided that the credit limit is not encountered.

In some embodiments, four transaction address spaces include a configuration address space, a memory address space, an input/output address space, and a message address space. Memory space transactions include one or more of read requests and write requests to transfer data to/from a memory-mapped location. In some embodiments, memory space transactions are capable of using two different address formats, e.g., a short address format, such as a 32-bit address, or a long address format, such as a 64-bit address. Configuration space transactions are used to access the configuration space of the PCIe devices. Transactions to the configuration space include read requests and write requests. Message space transactions (or, simply messages) are defined to support in-band communication between PCIe agents.

Therefore, in some embodiments, transaction layer 540 assembles packet header/payload 550. The format for packet headers/payloads may be found in the PCIe specification, i.e. the PCIe base spec 1.1, which is available at http://www.p-cisig.com/specifications/pciexpress/.

Figure 3:
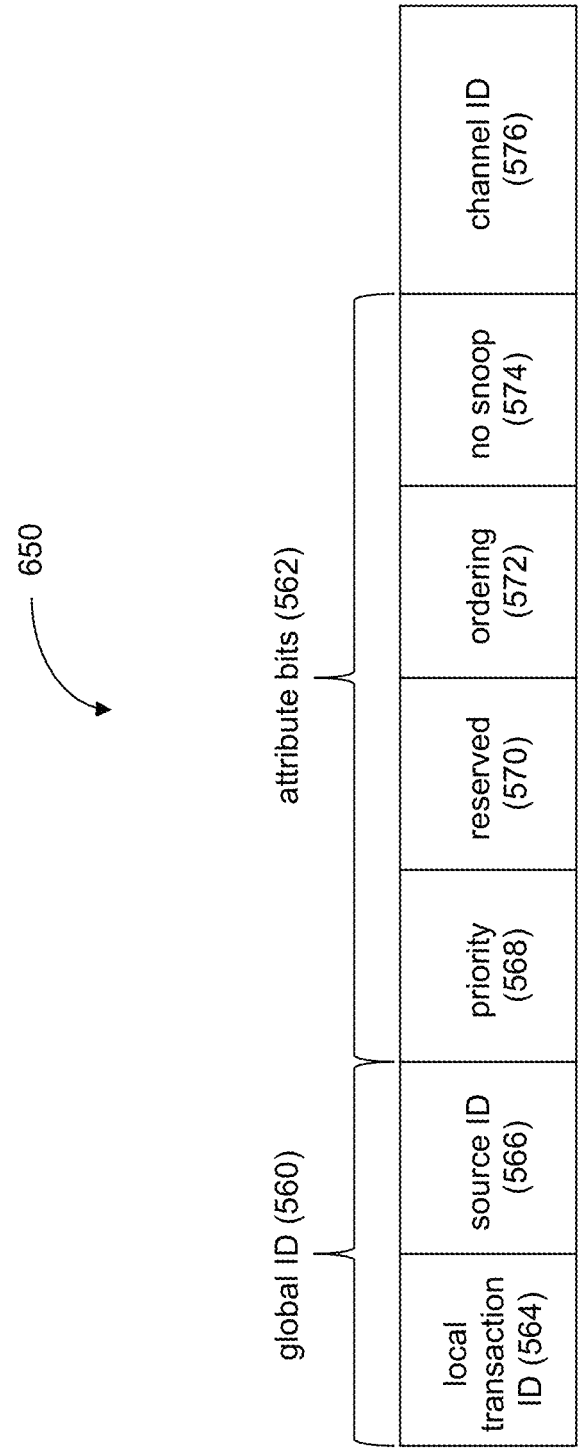
FIG. 3 is a simplified block diagram of a transaction descriptor, according to some embodiments.

FIG. 3 depicts a PCIe transaction descriptor 650, according to some embodiments. In some embodiments, the transaction descriptor 650 is a mechanism for carrying transaction information. In this regard, the transaction descriptor 600 supports identification of transactions in a system. Other potential uses include tracking modifications of default transaction ordering and association of the transaction with channels.

The transaction descriptor 650 includes a global identifier field 560, an attributes field 562, and a channel identifier field 576. In the illustrated example, the global identifier field 560 includes a local transaction identifier field 564 and a source identifier field 566. In some embodiments, the global transaction identifier 560 is unique for all outstanding requests.

According to one implementation, the local transaction identifier field 564 is a field generated by a requesting agent, and is unique for all outstanding requests that require a completion for that requesting agent. Furthermore, in this example, the source identifier 566 uniquely identifies the requestor agent within a PCIe hierarchy. Accordingly, together with the source ID 566, the local transaction identifier field 564 provides global identification of a transaction within a hierarchy domain.

The attributes field 562 specifies characteristics and relationships of the transaction. In this regard, the attributes field 562 is potentially used to provide additional information that allows modification of the default handling of transactions. In some embodiments, the attributes field 562 includes a priority field 568, a reserved field 570, an ordering field 572, and a no-snoop field 574. Here, the priority sub-field 568 may be modified by an initiator to assign a priority to the transaction. The reserved attribute field 570 is left reserved for future, or vendor-defined usage. Possible usage models using priority or security attributes may be implemented using the reserved attribute field 570.

In this example, the ordering attribute field 572 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. The no snoop attribute field 574 is utilized to determine if transactions are snooped. As shown, the channel ID Field 576 identifies a channel that a transaction is associated with.

Link Layer

Returning to FIG. 2, the link layer 542, also referred to as a data link layer 542, acts as an intermediate stage between the transaction layer 540 and the physical layer 544. In some embodiments, a responsibility of the data link layer 542 is providing a reliable mechanism for exchanging transaction layer packets (TLPs) between two components of a link. One side of the data link layer 542 accepts TLPs assembled by the transaction layer 540, applies a packet sequence identifier 552, i.e. an identification number or packet number, calculates and applies an error detection code, i.e. CRC 554, and submits the modified TLPs to the physical layer 544 for transmission across a physical path to an external device.

Physical Layer

In some embodiments, the physical layer 544 includes a logical sub block 546 and an electrical sub-block 548 to physically transmit a packet to an external device. Here, the logical sub-block 546 is responsible for the "digital" functions of the physical layer 544. In this regard, the logical sub-block 546 includes a transmit section, to prepare outgoing information for transmission by the electrical sub-block 548, and a receiver section, to identify and prepare received information before passing the received information to the link layer 542.

The electrical sub-block 548 of the physical layer 544 includes a transmitter and a receiver. The transmitter is supplied with symbols by the logical sub-block 546, which the transmitter serializes and transmits to an external device. The receiver is supplied with serialized symbols from the external device and transforms the received signals into a bit-stream. The bit-stream is de-serialized and supplied to the logical sub-block 546. In some embodiments, an 8b/10b transmission code is employed, where ten-bit symbols are transmitted/received. Here, special symbols are used to frame a packet with frames 556. In addition, in one example, the receiver also provides a symbol clock recovered from the incoming serial stream.

As stated above, although the transaction layer 540, the link layer 542, and the physical layer 544 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
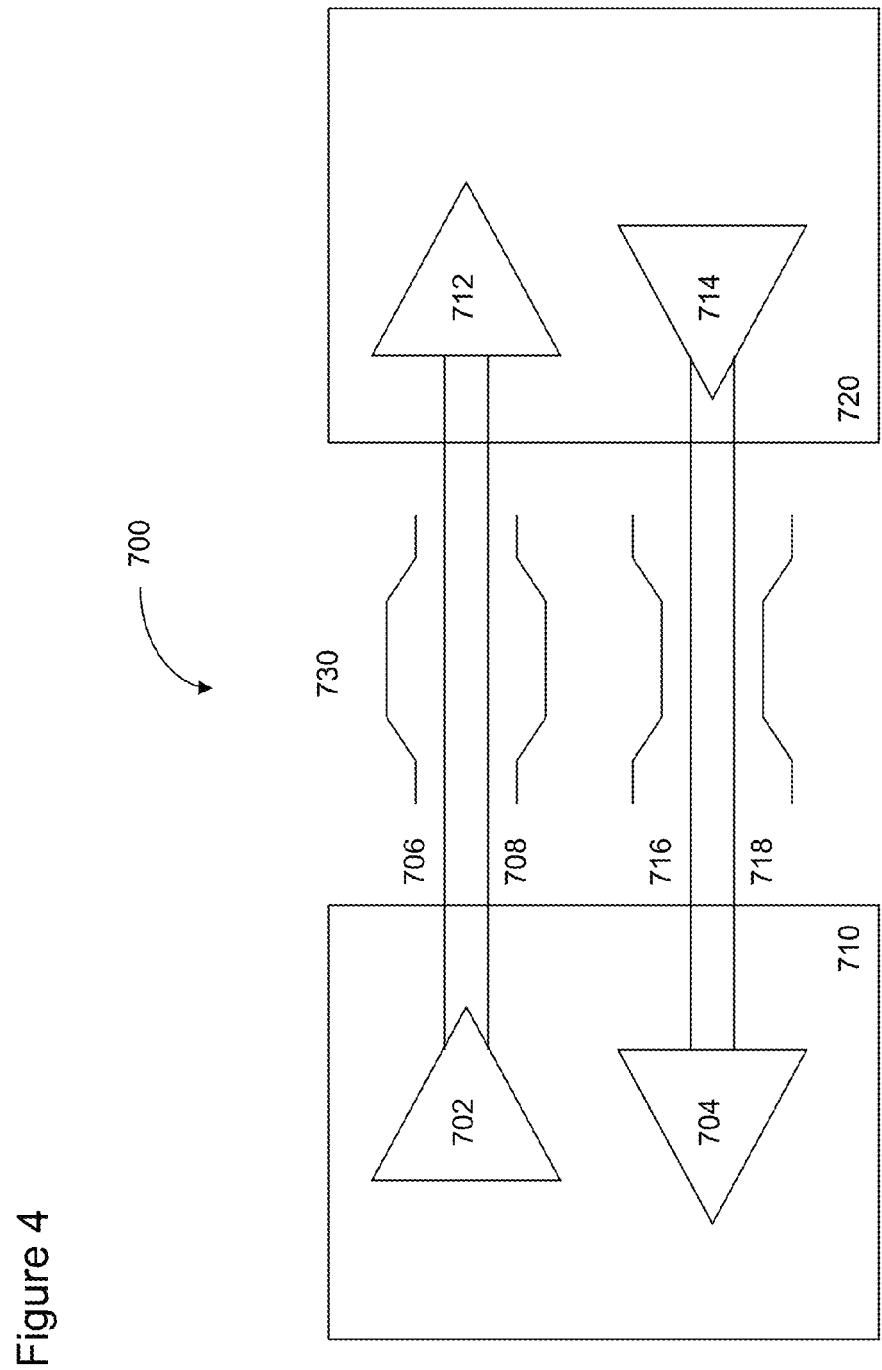
FIG. 4 is a simplified block diagram of a serial point-to-point link, according to some embodiments.

FIG. 4 is a simplified diagram of a PCIe serial point-to-point link, according to some embodiments. Although a PCIe serial point-to-point link is illustrated, a serial point-to-point link is not so limited, as a serial point-to-point link includes any transmission path for transmitting serial data. In the embodiment shown, at an electrical level, two unidirectional differential pairs form a lane. Accordingly, a device 710 includes transmission logic 702, to transmit data to a device 720, and receiving logic 704, to receive data from the device 720. In other words, two transmitting paths, i.e. paths 706 and 708, and two receiving paths, i.e. paths 716 and 718, are included in a PCIe lane.

A transmission path refers to any path for transmitting data, such as a transmission line, a copper line, an optical line, a wireless communication channel, an infrared communication link, or other communication path. A connection between two devices, such as devices 710 and 720, is referred to as a link, such as link 730. FIG. 4 illustrates a single lane in the link 730; however, any number of lanes may be present in the link such as 2, 4, 8, 12, 16, 32, 64, or wider.

A differential pair refers to two transmission paths, such as lines 706 and 708, to transmit differential signals. As an example, when line 706 toggles from a low voltage level to a high voltage level, i.e. a rising edge, line 708 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for a better timing window, which enables faster transmission frequencies.

Mobile Industry Processor Interface

Along with PCIe, a mobile industry processor interface (MIPI) is another serial interconnect protocol that focuses on power consumption. The MIPI protocol is thus suited to portable electronic devices in which power consumption is a concern. Along with the MIPI protocol, a new mobile physical layer (MPHY) specification has been defined.

AMBA/AXI

An advanced microcontroller bus architecture (AMBA) is a specification for an on-chip bus used in system-on-chip designs. The AMBA protocol includes an advanced extensible interface (AXI), advanced high-performance bus (AHB), and an advanced peripheral bus (APB).

Optimizing Power and Latency on a Link

Figure 5:
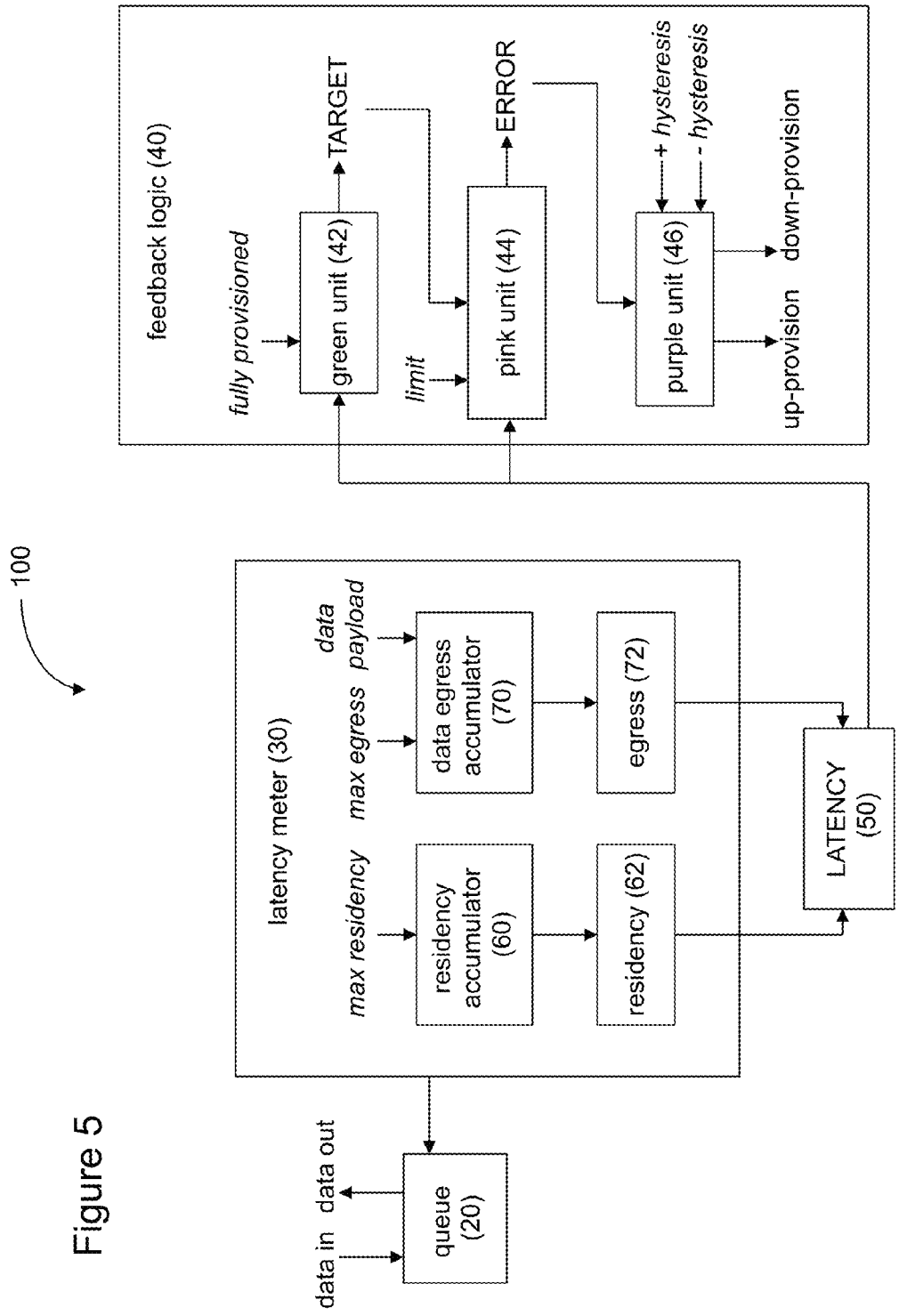
FIG. 5 is a simplified block diagram of a system for optimizing power and latency on a link, according to some embodiments.
Figure 6:
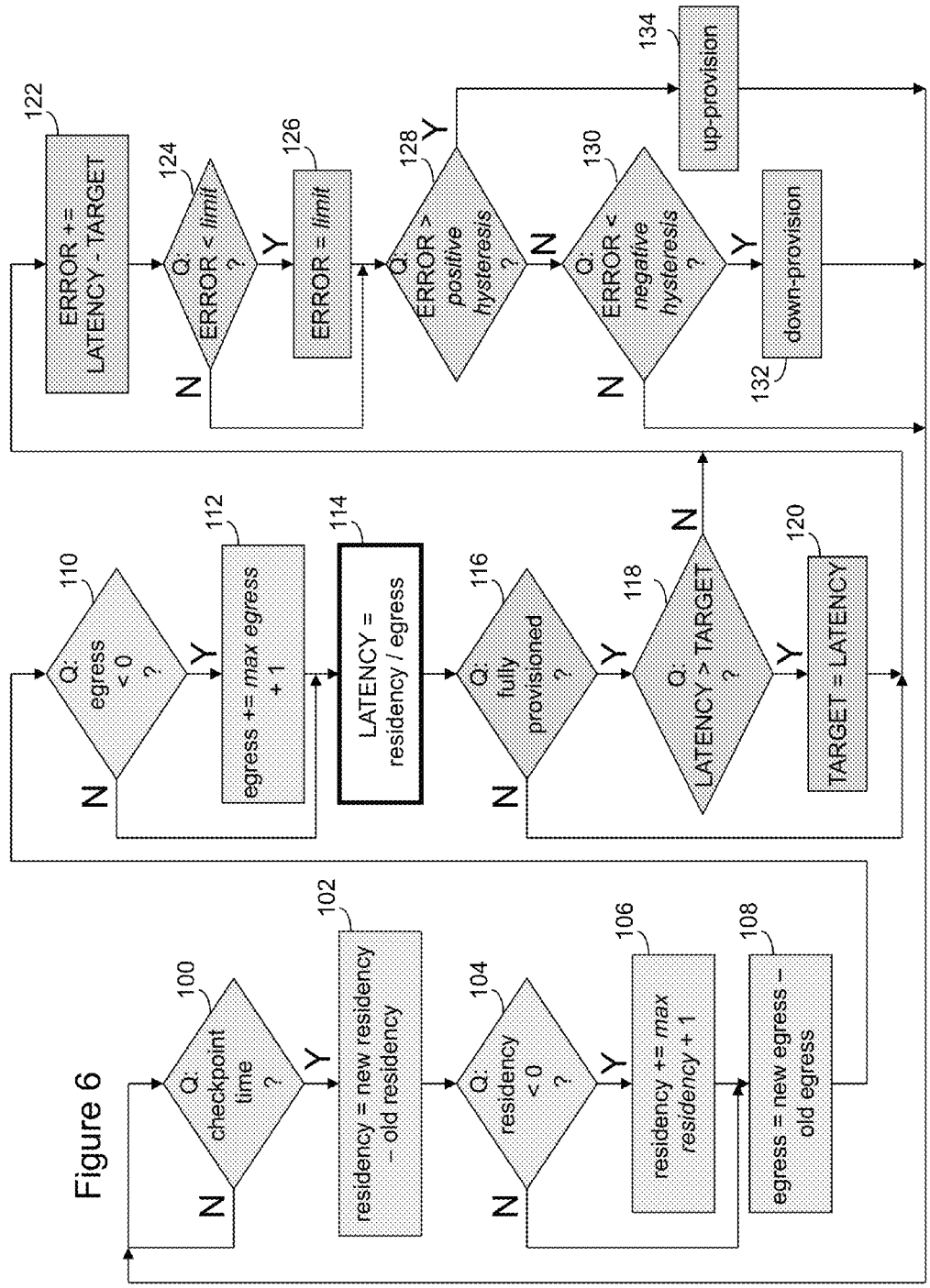
FIG. 6 is a simplified flow diagram showing operations performed by the system of FIG. 5, according to some embodiments.

FIG. 5 is a simplified block diagram of an apparatus 100 for optimizing the power and latency of a link in a processor-based system and FIG. 6 is a flow diagram of the method performed by the apparatus 100, according to some embodiments. The apparatus 100 in FIG. 5 includes a queue 20 coupled to a link (not shown), a latency meter 30, and feedback logic 40. Outputs are given in all capital letter type while variable inputs are given in italicized type.

The queue 20 receives data prior to the data being sent across the link. The queue 20 may be part of the sending unit, such as a CPU, disposed at one end of the link. The data entering into and leaving the queue 20 is measured by a latency meter 30. The latency meter 30 includes a residency accumulator 60, which keeps track of data entering and leaving the queue 20, and a data egress accumulator 70, which tracks just data leaving the queue. The latency meter 30 produces a latency value, LATENCY, which is used by the feedback logic 40. The variables, max residency and max egress, are received by the residency accumulator 60 and the data egress accumulator when calculating residency 62 and egress 72, respectively. The data egress accumulator 70 also accepts a data payload variable as input.

The feedback logic 40 includes three different parts, the first part denoted a green unit 42, the second part denoted a pink unit 44, and the third part denoted a purple unit 46. The green unit 42 receives the latency output, LATENCY, from the latency meter 30 and generates a target value, TARGET. The pink unit 44 uses TARGET to generate an error value, ERROR. The purple unit 46 uses ERROR to either up-provision or down-provision the link connected to the queue 20.

The latency meter consists of two counters, the residency accumulator 60 and the data egress accumulator 70. In some embodiments, the first counter, the residency accumulator 60, acts as a gated timer; if anything is in the queue 20, then the timer runs. Otherwise, the timer stops. The counter output is the residency 62 of the queue 20. The timer 60 is only reset at power-on. The timer overflows back to zero and continues counting. The difference between two readings (checkpoints) spanning an interval less than a minimum overflow interval will provide the number of cycles that the queue 20 was occupied.

The second counter, the data egress accumulator 70, accumulates transaction layer packet (TLP) egresses or, more generally, data egresses, from the queue 20. The output of the counter 70 is the egress 72. The TLPs are made up of a header and data. In some embodiments, the data egress accumulator 70 counts the entire TLP, including the header. In other embodiments, the data egress accumulator 70 counts just the data of the TLP. In still other embodiments, using the variable, data payload, the data egress accumulator 70 is programmable as to whether the entire TLP or a portion of the TLP is counted by the counter 70.

Whatever the specific implementation, the data egress accumulator 70 accumulates traffic that is representative of work being done on the link of the processor-based system. The data egress accumulator 70 overflows and is checkpointed in the same manner as the first counter, the residency accumulator 60.

The ratio of the residency 62 to the egress 72 is a direct measure of average latency through the queue 20. In other words, the latency of the system is proportional to the ratio of the residency to the egress. Put mathematically, the formula is:

$$latency \sim residency/egress$$

In some embodiments, the proportion is one-to-one:

$$LATENCY = residency/egress \quad (1)$$

Further, in some embodiments, this "direct" latency is 100% statistically accurate: no events are missed.

The feedback logic 40 consists of a first part, known as the green unit 42, a second part, known as the pink unit 44, and a third part, known as the purple unit 46. The operations of FIG. 6 are color-coded to correspond to the parts of the feedback logic, with the latency meter 30 portion shown in blue.

In some embodiments, the green unit 42 of the feedback logic 40 (FIG. 5) tracks the maximum latency when the link is fully provisioned and produces a target value, TARGET. Whether the link is fully provisioned is received as an input, in some embodiments. The algorithm is:

```
IF fully provisioned THEN
    IF TARGET < LATENCY THEN
        TARGET = LATENCY
    ENDIF
ENDIF                                                    (2)
```

The target value, TARGET, is thus a moving value that adjusts based on the link traffic. In some embodiments, the target value, TARGET, is cleared at power-on, and may be arbitrarily cleared at any time. In some embodiments, when the link is running at a full load and still meeting its quality of service requirements, TARGET=LATENCY.

In some embodiments, the second portion of the feedback logic 40, the pink unit 44 tracks differences between the target value, TARGET and the latency value, LATENCY, when the link is not fully provisioned, resulting in an error value, ERROR. The algorithm is:

$$ERROR += LATENCY - TARGET$$

$$ERROR = floor(ERROR, limit) \quad (3)$$

In the first part of the algorithm (3), a positive error means the average latency is too high, so the difference between the latency value, LATENCY, and the target value, TARGET, is added to the error value, ERROR. The second part of the algorithm (3) prevents the error from going too negative by imposing a floor on the error, based on the input parameter, limit.

In some embodiments, the third part of the feedback logic 40, the purple unit 46, adds provision if the error is positive, and sheds provision if the error is negative. The algorithm is:

```
IF ERROR > positive hysteresis THEN
    add provisioning
ELSE
IF ERROR < = negative hysteresis THEN
    shed provisioning
ENDIF                                                    (4)
```

By "adding provisioning", shown in FIG. 5 as "up-provision", the purple unit 46 reduces latency and burns more power on the link. By "shedding provisioning", shown in FIG. 5 as "down-provision", the purple unit 46 reduces power to the link. The parameters, positive hysteresis and negative hysteresis, are used to reduce chatter for small variations in error from one checkpoint to the next. In some embodiments, the purple unit 46 is a noise filter that keeps the link from unnecessarily up-provisioning, then down-provisioning, then up-provisioning, and so on.

FIG. 6 is a simplified block diagram showing operations of the apparatus 100 of FIG. 5 to optimize power and latency on a link of a processor-based system. The operations are divided into five parts. A checkpoint time (yellow) is an adjustable time period for performing the optimization operations. The operations of the latency meter 30 to obtain the residency 62, egress 72, and, ultimately, the calculation of the residency and egress (blue), used to determine the LATENCY 50, take place first. Then, the feedback logic 40 is divided into the green unit 42, the pink unit 44, and the purple unit 46.

In some embodiments, the process is initiated at the adjustable checkpoint time. When the checkpoint time arrives (block 100), the control proceeds to the latency meter 30 (blue), which includes the two counters, the residency accumulator 60 and the data egress accumulator 70. The residency parameter 62 is updated by obtaining a new residency value (by checking the queue 20) and subtracting the old residency value, that is, the previously calculated residency 62, from a newly measured residency (block 102). If the subtraction renders the residency parameter 62 negative (the "yes" prong of block 104), then the residency parameter 62 is assigned a value one greater than a predefined maximum residency value (max residency) (block 106). When the residency parameter 62 is not negative (the "no" prong of block 104), then the residency parameter 62 is left unchanged and control proceeds to the data egress accumulator 72 of the latency meter 30.

Much like the residency accumulator 60, the data egress accumulator 70 updates the egress parameter 72 by obtaining a new egress value (by checking the queue 20) and subtracting the previously calculated egress value 72 from a newly obtained one (block 108). If the subtraction makes the egress parameter 72 negative (the "yes" prong of block 110), then the egress parameter 72 is assigned a value one greater than a predefined maximum egress value (max egress) (block 112). When the egress parameter 72 is not negative (the "no" prong of block 110), then the egress parameter 72 is left unchanged. The apparatus 100 thus has the two parameters, residency 62 and egress 72, that are used to calculate the latency 50. The latency is calculated using formula (1), above (block 114).

An example is useful to illustrate how the latency meter 30 is keeping track of the residency 62 and the egress 72, in some embodiments. Both portions of the latency meter 30 are anticipating rollover of the memory location storing the residency 62 and the egress 72, with max_residency and max_egress being the largest number that can be stored in the memory location. Thus, suppose the residency 62 is stored in a 16-bit memory location. The biggest number that may be stored in the location is 65,535 (1111111111111111b), thus, max_residency is 65,535. Suppose that the old residency from the previous checkpoint (old_residency) is 60,000 and the new residency from the current checkpoint (new_residency) is 1,000. It is clear that the residency counter "rolled" past the 65,535 limit of the counter.

Thus, to get an accurate count for the residency 62, in some embodiments, the latency meter 30 calculates the "difference at the top" and the "difference at the bottom", then adds the two differences together. The difference at the top is 65,535-60,000, which is 5,535. The difference at the bottom is 1,000-0+1, or 1,001, with the extra 1 being added to account for the number, 0, being one of the states. The sum of the differences, 5,535+1,001=6,536.

Looking again to FIG. 6, the old residency, 60,000, is subtracted from the new residency, 1,000, giving a value to the residency 62 of −59,000 (block 102). Since residency is a negative number (the "yes" prong of block 104), block 104 is executed: residency+=max residency+1, which is −59,000+65,535=6,535, then adding 1 to get the correct final result of 6,536. Similar calculations are made to accurately calculate egress by the latency meter 30.

Control next proceeds to the green unit 42 of the method 100. If the link is fully provisioned (the "yes" prong of block 116), the latency parameter, LATENCY, is compared to a target parameter, TARGET (block 118). If LATENCY exceeds TARGET (the "yes" prong of block 118), then the target parameter, TARGET, is set to the current latency value (block 120). Otherwise (the "no" prong of block 118), the target, TARGET, remains unchanged. If, however, the link is not fully provisioned (the "no" prong of block 116), no action is taken by the green unit 42 and the target variable, TARGET, remains unchanged. The operations of the green unit 42 thus emulate the pseudocode given in the algorithm (2), above.

Control proceeds next to the pink unit 44 of the method 100. There, the error value, ERROR, is updated by adding the difference between LATENCY and TARGET to ERROR (block 122). Where TARGET is set to equal LATENCY (block 120), this would make the error value, ERROR, remain unchanged. Next, the error is compared to a limit parameter, limit, which may be received as an input to the pink unit 44 (block 124). If the error is less than limit (the "yes" prong of block 124), ERROR is set to the limit value, limit (block 126). Otherwise (the "no" prong of block 124), ERROR is left unchanged. The operations of the pink unit 44 thus emulate the pseudocode given in the algorithm (3), above.

Next, the purple unit 46 receives the error value, ERROR, from the pink unit 44. The purple unit 46 also receives two parameters, positive hysteresis and negative hysteresis as inputs. If ERROR exceeds positive hysteresis (the "yes" prong of block 128), the link is up-provisioned (block 134), or increased in value. Otherwise (the "no" prong of block 128), if ERROR is lower than negative hysteresis (the "yes" prong of block 130), the link is down-provisioned (block 132), or decreased in value. Otherwise (the "no" prong of block 130), no change is made to the link. The operations of the purple unit 46 thus emulate the pseudocode given in the algorithm (4), above.

In some embodiments, the latency meter 30 portion of the apparatus 100 is implemented in hardware, with the two queue counters 60, 70 being implemented as "gates", while the feedback logic 40 is implemented in software or firmware. The "fully provisioned" (block 116), "up-provision" (block 134), and "down-provision" (block 132) status and controls are part of the PCie specification, the root-complex, and the endpoint.

Figure 7:
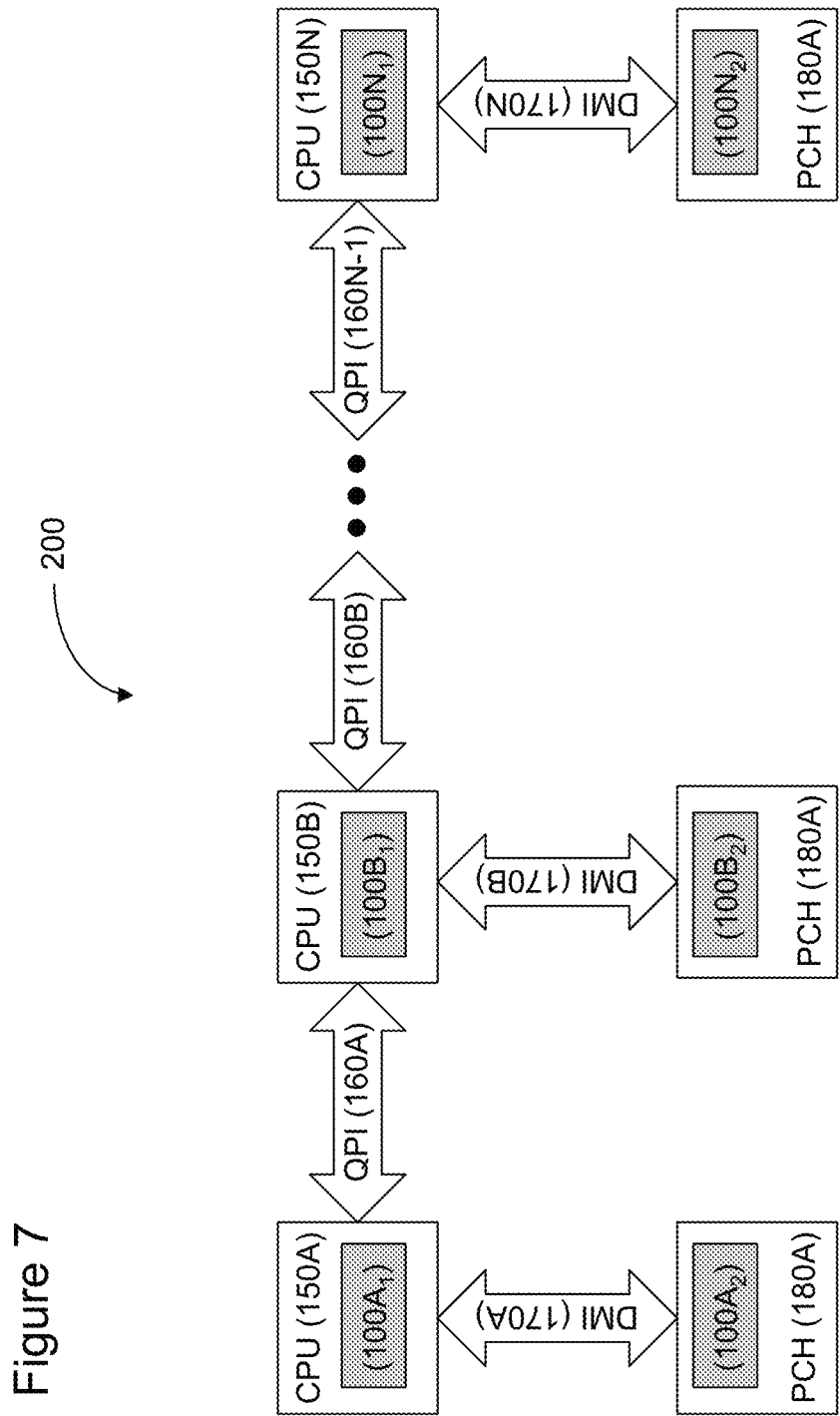
FIG. 7 is a simplified block diagram of a multiprocessor system utilizing the system of FIG. 5 to optimize power and latency on one or more links within the multiprocessor system, according to some embodiments.

FIG. 7 is a simplified block diagram of a multiprocessor system 200 utilizing the method and apparatus 100, according to some embodiments. The multiprocessor system 200 includes N central processing units (CPUs) 150A, 150B, . . . , 150N (collectively, "CPUs 150"), which are coupled to N−1 specialized busses, known as quick path interconnect (QPI) busses 160A, 160B, . . . , 160N−1 (collectively, "QPI busses 160"). The QPI busses 160, specifically designed for the CPUs, speed up communication between the CPUs 150. The CPUs may also be coupled to one or more volatile memories, a specialized graphics processor, and other circuitry (not shown).

Also featured in the multiprocessor system 200 are up to N peripheral controller hubs (PCHs) 180A, . . . , 180N (collectively, "PCHs 180") coupled to the CPUs 150 via up to N specialized busses, known as direct media interface (DMI) busses 170A, 170B, . . . , 170N. The PCHs 180 interface between the CPUs 150 and one or more peripheral devices of the multiprocessor system 200. The PCHs 180 may include display, input/output (I/O) control, a real-time clock, and other functions and may connect to an integrated display as well as other peripheral devices, such as a keyboard, a mouse, a non-volatile storage device, and so on (not shown).

The apparatus 100 may be used to optimize the various links of the system 200. In some embodiments, the apparatus 100 is available in each of the CPUs 150, as well as in each of the PCHs 180. FIG. 7 shows the apparatus $100A_1$, $100B_1, \ldots, 100N_1$, as part of respective CPUs 150A, 150B, . . . , 150N and the apparatus $100A_2, 100B_2, \ldots, 100N_2$, as part of respective PCHs 180A, 180B, . . . , 180N. The apparatus $100A_1$ and $100B_1$ may, for example, optimize power and latency for data traversing the QPI bus 160A between the CPU 150A and the CPU 150B, while the apparatus $100A_1$ and $100A_2$ optimize power and latency for data traversing the DMI bus 170A between the CPU 150A and the PCH 180A. Other arrangements of the apparatus 100 within a multiprocessor or uniprocessor system will become evident to system designers of ordinary skill in the art.

In some embodiments, the "fully provisioned", "up-provisioned", and "down-provisioned" part of the method 100 refers to the link width. Thus, a link operating as a ×4 link at full load would be considered fully provisioned when up-provisioned to a ×8 link, and could be down-provisioned to a ×2 link or a ×1 link, as needed to optimize the power and latency.

In other embodiments, the "fully provisioned", "up provisioned", and "down-provisioned" part of the method 100 refers to the system clock or one of the CPU clocks of the processor-based system. Thus, a PCIe system operating at 5 GT/s (known as Gen 2) may be up-provisioned to an 8 GT/s system (Gen 3), or down-provisioned to a 2.5 GT/s system (Gen 1), as one example.

In still other embodiments, the "fully provisioned", "up provisioned", and "down-provisioned" part of the method 100 refers to the system power-on state, whether it be operating at full power (fully provisioned), or in one of the low power states, commonly known as STANDBY and SLEEP. Under PCIe, low power states L0, L0s, L1, and L2 are available, as one example. Under QPI, low power states L0, L1, and L3 are available. During up-provisioning, the power state is changed from a first power-managed state to a second power-managed state, where the second power-managed state is less power-managed than the first.

When the apparatus 100 is running, the following occurs. When the processor-based system is powered on, the link in question runs at full provision because the maximum latency is likely tracking the actual system latency as it increases with load. Then, a high load is applied to the link, which increases the latency. The target value, TARGET "trains up" to the maximum LATENCY at full provision. When the load to the link is reduced, the apparatus 100 down-provisions the link to save power. At all load levels, the link saves all the power possible by running at the minimum provision possible to maintain the average latency at the full-provision full-load target. Full-load in this context refers to the fullest load that the system has experienced since the system was booted or since the state of the power controller was reset. Full-load does not necessarily refer to the fullest load capacity of the system.

In addition to the programmable parameters (in italics), the apparatus 100 may also consider the following provisions:

1. Low-power "off" states with various exit times (e.g. L0s, L1, etc.)
2. Partial link-width states (e.g. L0p, DLW, etc.). L0p is the nomenclature used for QPI and DLW is the link width designator for PCIe.
3. CPU clock frequency changes Although PCie is used as the prime problem domain in the above embodiments, the method and apparatus 100 may be applied to any link that possesses multiple provisioning capabilities.

Figure 8:
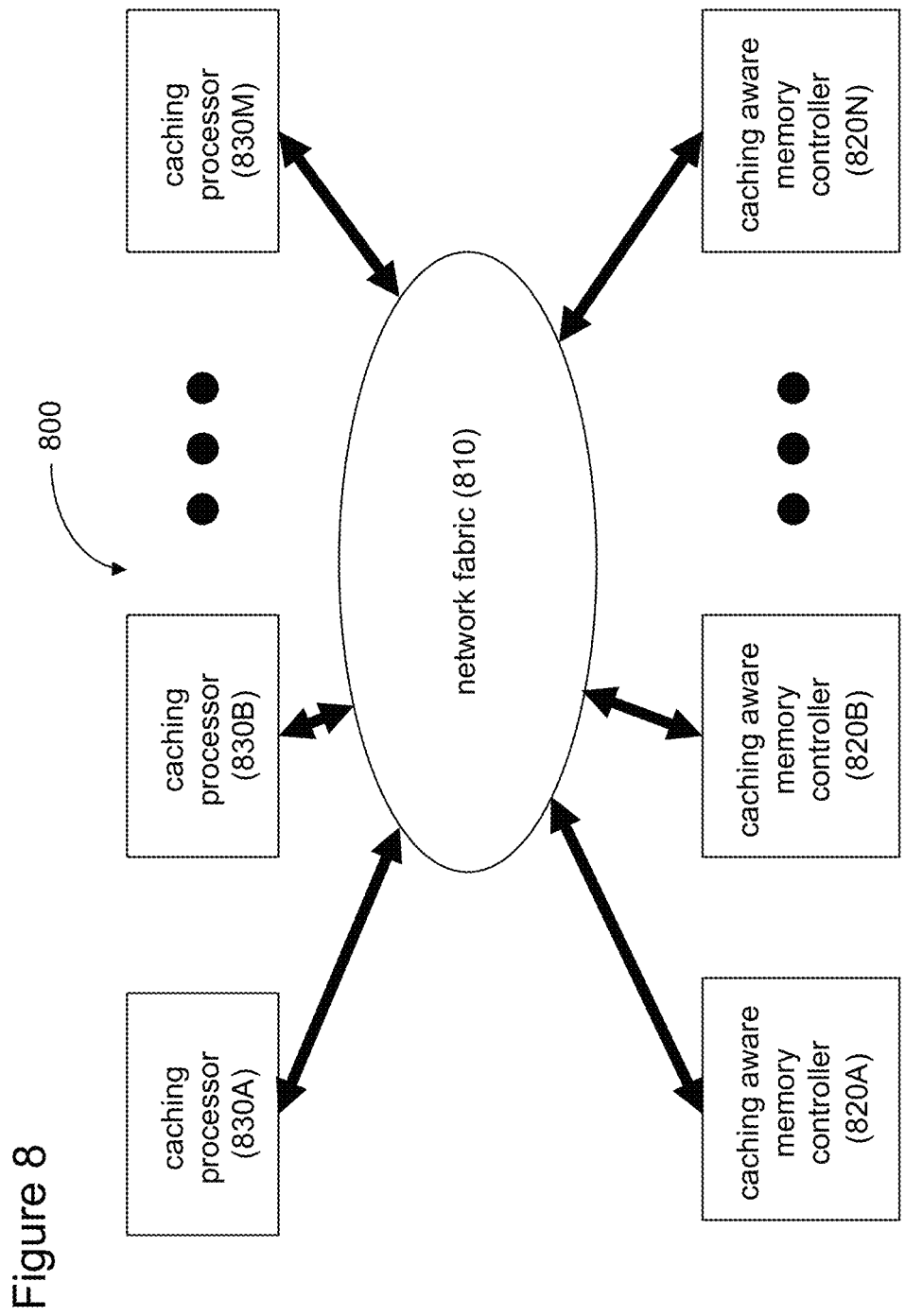
FIG. 8 is a diagram of a protocol architecture as utilized by one embodiment.

FIG. 8 is a simplified block diagram of a protocol architecture, according to some embodiments. The architecture depicts a plurality of caching processors 830A, 830B, . . . , 830M (collectively, "caching agents 830") and memory controllers 820A, 820B, . . . , 820N (collectively, "home agents 820") coupled to a network fabric 810. For example, the network fabric adheres to a layered protocol scheme and may comprise either or all of: a link layer, a physical layer, a protocol layer, a routing layer, and a transport layer. The fabric facilitates transporting messages from one protocol (home or caching agent) to another protocol for a point-to-point network. In one aspect, FIG. 8 depicts a cache coherence protocol's abstract view of the underlying network.

In some embodiments, the protocol may be cache coherent that adheres to a MESIF (modified exclusive shared invalid forward) scheme. In another embodiment, the protocol may adhere to a MESI (modified exclusive shared invalid) scheme. In still another embodiment, the protocol may allow for some IP blocks and cores to adhere to a cache coherence scheme while other IP blocks and cores do not support cache coherence.

In another embodiment, the network fabric 810 may be utilized for any system-on-chip application, utilize custom or standard interfaces, such as ARM-compliant interfaces for AMBA (advanced microcontroller bus architecture), OCP (open core protocol), MIPI (mobile industry processor interface), PCI, or PCIe.

Figure 9:
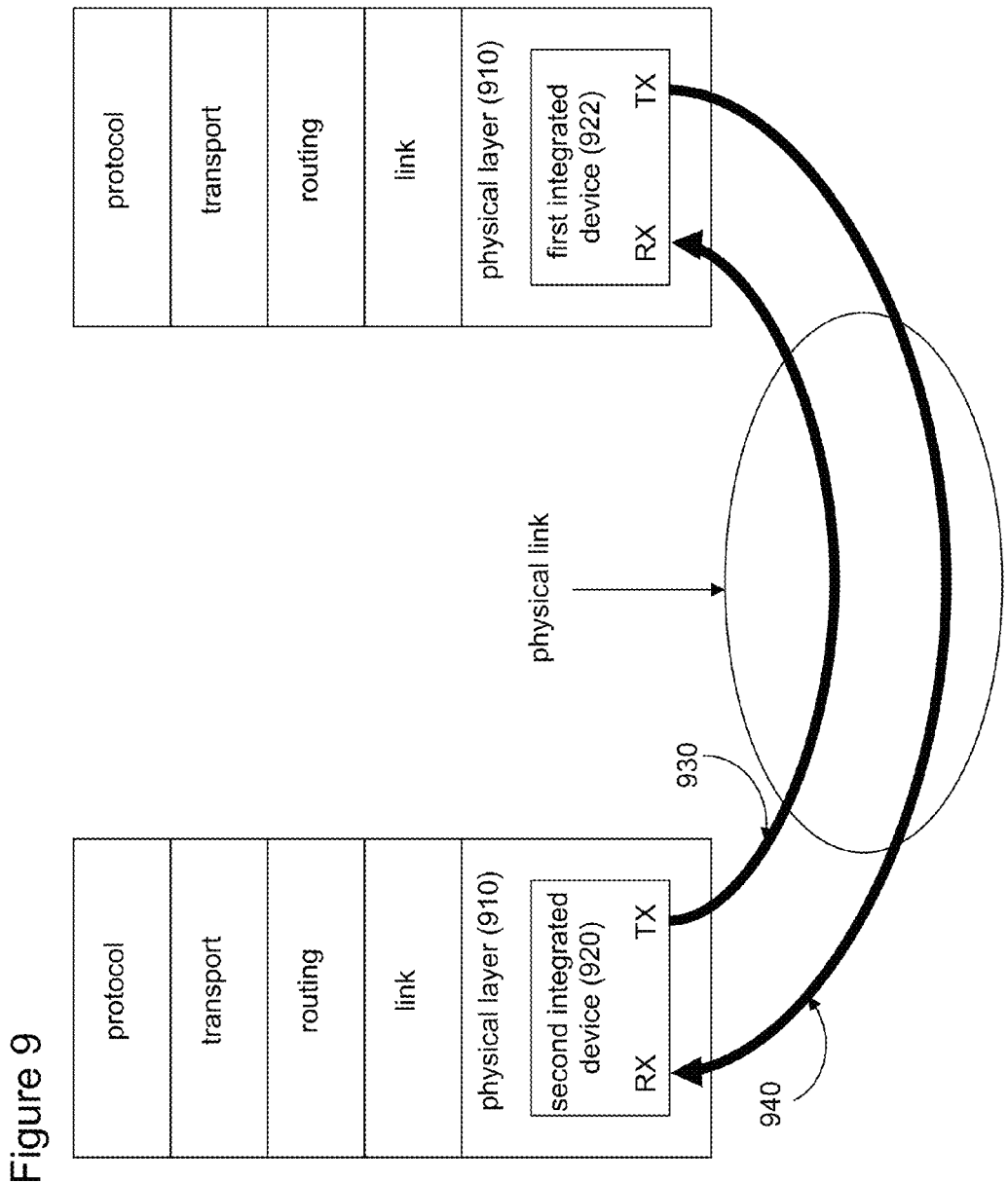
FIG. 9 is a block diagram of an apparatus for a physical interconnect utilized in accordance with the claimed subject matter.

FIG. 9 is a block diagram of an apparatus for a physical interconnect utilized in accordance with the claimed subject matter. In one aspect, the apparatus depicts a physical layer for a cache-coherent, link-based interconnect scheme for a processor, chipset, and/or I/O bridge components. For example, the physical interconnect may be performed by each physical layer of an integrated device. Specifically, the physical layer provides communication between two ports over a physical interconnect comprising two uni-directional links. Specifically, one uni-directional link 940 initiates from a first transmit port (TX) of a first integrated device 922 to a first receiver port (RX) of a second integrated device 920. Likewise, a second uni-directional link 930 initiates from a first transmit port (TX) of the second integrated device 920 to a first receiver port (RX) of the first integrated device 922. However, the claimed subject matter is not limited to two uni-directional links. One skilled in the art appreciates the claimed subject matter supports any known signaling techniques, such as, bi-directional links, etc.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. An apparatus to optimize the power of a link in a processor-based system, the apparatus comprising:
a latency meter to calculate a latency value of data to occupy a queue connected to the link, the data to be transmitted across the link between a first unit and a second unit of the processor-based system; and
feedback logic to receive the latency value from the latency meter, wherein the feedback logic either up-provisions the link, down-provisions the link, or maintains a provisioning level to the link based on the latency value.

2. The apparatus of claim 1, the latency meter further comprising:
a first timer to calculate a residency value of the link, the first timer to operate as follows:
in response to data being in the queue, the timer runs; and
in response to no data being in the queue, the timer stops;
wherein the calculated residency value is used by the latency meter to obtain the latency value.

3. The apparatus of claim 2, the latency meter further comprising:
a second timer to calculate an egress value of the link, the second timer to operate as follows:
in response to data leaving the queue, the timer increments;
wherein the calculated egress value is used by the latency meter to obtain the latency value.

4. The apparatus of claim 3, wherein the latency meter calculates the latency value using the following formula:

latency value=(residency value)/(egress value).

5. The apparatus of claim 1, the feedback logic further comprising:
a first unit to calculate a target value based on the latency value from the latency meter;
wherein the first unit does not modify the target value in response to the link being not fully provisioned.

6. The apparatus of claim 5, where the first unit employs the following algorithm:
in response to the link being fully provisioned and in response to the target value being less than the latency value, set the target value to be equal to the latency value.

7. The apparatus of claim 5, the feedback logic further comprising:
a second unit to calculate an error value based on the latency value and the target value, wherein the second unit receives a limit parameter, limit, as input;
wherein limit imposes a floor on the error value.

8. The apparatus of claim 7, wherein the second unit employs the following algorithm:

error value=error value+(latency value−target value); and error value=floor(error value,limit).

9. The apparatus of claim 7, the feedback logic further comprising:
a third unit to receive the error value from the second unit, wherein the third unit receives two hysteresis parameters, positive hysteresis and negative hysteresis;
wherein the third unit either up-provisions the link, down-provisions the link, or leave the link unchanged based on the error value.

10. The apparatus of claim 9, wherein the third unit employs the following algorithm:
in response to the error value being greater than positive hysteresis, add provisioning;
otherwise, in response to the error value being less than or equal to negative hysteresis, shed provisioning.

11. The apparatus of claim 9, wherein the third unit up-provisions the link by increasing a width of the link and the third unit down-provisions the link by decreasing the width of the link.

12. The apparatus of claim 9, wherein the third unit up-provisions the link by increasing a clock speed for processing data transmitted across the link and the third unit down-provisions the link by decreasing the clock speed of the link.

13. The apparatus of claim 9, wherein the third unit up-provisions the link by increasing a power management state of the link and the third unit down-provisions the link by decreasing the power management state of the link.

14. The apparatus of claim 1, wherein the processor-based system is a mobile device having a radio and touch-enabled input and the link is in accordance with a mobile industry processor interface protocol.

15. A method to optimize the power of a link in a processor-based system, the method comprising:
determining a latency of a link by monitoring data entering and leaving a queue, the queue being disposed at one end of the link and containing data to be transmitted across the link, wherein the latency is proportional to data residency in the queue divided by data egress from the queue; and
allowing the link to be fully provisioned;
applying a high load to the link;
calculating a target latency of the link while the link is fully provisioned; and
down-provisioning the link in response to the latency falling below the target latency.

16. The method of claim 15, allowing the link to be fully provisioned further comprising:
increasing a width of the link.

17. The method of claim 15, allowing the link to be fully provisioned further comprising:
increasing an operating speed of the link.

18. The method of claim 15, allowing the link to be fully provisioned further comprising:
decreasing a power management state of the link, wherein a full power state is less power-managed than a first low power state, which is less power-managed than a second low power state.

19. The method of claim 15, determining the latency of the link further comprising:
calculating the data residency of the queue using a gated timer, wherein the gated timer operates as follows:
in response to data being in the queue, the gated timer runs; and
in response to no data being in the queue, the gated timer stops.

20. The method of claim 19, determining the latency of the link further comprising:
  calculating the data egress from the queue using a second gated timer, wherein the second gated timer operates as follows:
    in response to data leaving the queue, the second gated timer increments.

21. The method of claim 15, further comprising:
  calculating an error based on the latency and the target latency;
  up-provisioning the link in response to the error exceeding a positive hysteresis value; and
  down-provisioning the link in response to the error being less than a negative hysteresis value.

22. An apparatus to optimize power in an interconnect fabric comprising:
  latency logic to determine a target value associated with a queue for a link in the interconnect fabric based on a residency metric and a work metric for the queue over a first interval and to determine a latency value associated with the queue over a second interval; and
  control logic coupled to the latency logic, the control logic to:
    request an increase of power to the link in response to the latency value being a first amount greater than the target value;
    request a reduction in power to the link in response to the latency value being a second amount less than the target value; and
    not request a change in power to the link in response to the latency value being between the second amount less than the target value and the first amount greater than the target value.

23. The apparatus of claim 22, wherein the link is a quick path interconnect between two processors in a multi-processor system.

24. The apparatus of claim 22, wherein the link is a direct media interface interconnect between a processor and a peripheral controller hub of a processor-based system.

25. The apparatus of claim 22, wherein the link is a serial link between a graphics accelerator and a controller hub of a processor-based system.

26. The apparatus of claim 22, wherein the link is a front-side bus between a processor and a controller hub of a processor-based system.

27. The apparatus of claim 22, wherein the link is a memory interface between a memory and a controller hub of a processor-based system.

28. The apparatus of claim 22, wherein the link is a serial link between a controller hub and a switch/bridge of a processor-based system.

29. The apparatus of claim 22, wherein the link is a serial point-to-point link comprising a differential signal pair.

30. The apparatus of claim 22, wherein the link is an advanced microcontroller bus architecture.

* * * * *